(12) United States Patent
Cohen et al.

(10) Patent No.: US 12,066,545 B2
(45) Date of Patent: Aug. 20, 2024

(54) POWER-EFFICIENT HAND TRACKING WITH TIME-OF-FLIGHT SENSOR

(71) Applicant: Magic Leap, Inc., Plantation, FL (US)

(72) Inventors: David Cohen, Nesher (IL); Elad Joseph, Atlit (IL); Eyal Preter, Givat Ela (IL); Paul Lacey, Plantation, FL (US); Koon Keong Shee, Miramar, FL (US); Evyatar Bluzer, Yuvalim (IL)

(73) Assignee: Magic Leap, Inc., Plantation, FL (US)

( * ) Notice: Subject to any disclaimer, the term of this patent is extended or adjusted under 35 U.S.C. 154(b) by 648 days.

(21) Appl. No.: 17/210,152

(22) Filed: Mar. 23, 2021

(65) Prior Publication Data
US 2021/0302587 A1    Sep. 30, 2021

Related U.S. Application Data

(60) Provisional application No. 62/994,152, filed on Mar. 24, 2020.

(51) Int. Cl.
*G01S 17/894* (2020.01)
*G06F 3/01* (2006.01)
*G06F 3/03* (2006.01)

(52) U.S. Cl.
CPC ............ *G01S 17/894* (2020.01); *G06F 3/017* (2013.01); *G06F 3/0325* (2013.01)

(58) Field of Classification Search
CPC .......................... G06V 10/141; G06V 10/143
See application file for complete search history.

(56) References Cited

U.S. PATENT DOCUMENTS

| 7,464,351 | B2* | 12/2008 | Bamji | G01C 3/00 |
| | | | | 257/E31.115 |
| 2017/0272651 | A1* | 9/2017 | Mathy | H04N 5/2226 |
| 2017/0316602 | A1* | 11/2017 | Smirnov | H04N 13/189 |
| 2018/0059224 | A1* | 3/2018 | Wang | G01S 17/10 |
| 2019/0094342 | A1* | 3/2019 | Hiramatsu | G01S 7/4808 |
| 2022/0308228 | A1* | 9/2022 | Raag | G01S 17/86 |

OTHER PUBLICATIONS

Foix et al., Lock-in Time-of-Flight (ToF) Cameras: A Survey, IEEE Sensors Journal, vol. 11, No. 9, Sep. 2011, pp. 1917-2011.*

* cited by examiner

*Primary Examiner* — Guillermo M Rivera-Martinez
(74) *Attorney, Agent, or Firm* — KILPATRICK TOWNSEND & STOCKTON LLPX

(57) ABSTRACT

Techniques are disclosed for operating a time-of-flight (TOF) sensor. The TOF may be operated in a low power mode by repeatedly performing a low power mode sequence, which may include performing a depth frame by emitting light pulses, detecting reflected light pulses, and computing a depth map based on the detected reflected light pulses. Performing the low power mode sequence may also include performing an amplitude frame at least one time by emitting a light pulse, detecting a reflected light pulse, and computing an amplitude map based on the detected reflected light pulse. In response to determining that an activation condition is satisfied, the TOF may be switched to operate in a high accuracy mode by repeatedly performing a high accuracy mode sequence, which may include performing the depth frame multiple times.

20 Claims, 12 Drawing Sheets

POWER-EFFICIENT HAND TRACKING WITH TIME-OF-FLIGHT SENSOR

CROSS-REFERENCES TO RELATED APPLICATIONS

This application claims the benefit of priority to U.S. Provisional Patent Application No. 62/994,152, filed Mar. 24, 2020, entitled "SYSTEMS AND TECHNIQUES FOR POWER-EFFICIENT HAND TRACKING," the entire content of which is incorporated herein by reference for all purposes.

BACKGROUND OF THE INVENTION

A time-of-flight (TOF) camera (or sensor) is a range imaging camera system that resolves distance based on the speed of light, measuring the time-of-flight of a light signal between the camera and the subject for each point of the image. With a time-of-flight camera, the entire scene can be captured with each laser or light pulse. Time-of-flight camera products have become popular as semiconductor devices have become faster to support such applications. Direct Time-of-Flight imaging systems measure the direct time-of-flight required for a single laser pulse to leave the camera and reflect back onto the focal plane array. The 3D images can capture complete spatial and temporal data, recording full 3D scenes with a single laser pulse. This allows rapid acquisition and real-time processing of scene information, leading to a wide range of applications. These applications include automotive applications, human-machine interfaces and gaming, measurement and machine vision, industrial and surveillance measurements, and robotics, etc.

The simplest version of a TOF sensor uses light pulses or a single light pulse. The illumination is switched on for a short time, the resulting light pulse illuminates the scene and is reflected by the objects in the field of view. The camera lens gathers the reflected light and images it onto the sensor or focal plane array. The time delay between the outgoing light and the return light is the time of flight, which can be used with the speed of light to determine the distance. A more sophisticated TOF depth measurement can be carried out by illuminating the object or scene with light pulses using a sequence of temporal windows and applying a convolution process to the optical signal received at the sensor.

In some instances, a TOF sensor can be used in an augmented reality (AR), virtual reality (VR), or mixed reality (MR) environment to track a user's hand and predict hand gestures or poses. The use of hand gestures as an input within AR/VR/MR environments has a number of attractive features. First, in an AR environment in which virtual content is overlaid onto the real world, hand gestures provide an intuitive interaction method which bridges both worlds. Second, there exist a wide range of expressive hand gestures that could potentially be mapped to various input commands. For example, a hand gesture can be exhibiting a number of distinctive parameters simultaneously, such as handshape (e.g., the distinctive configurations that a hand can take), orientation (e.g., the distinctive relative degree of rotation of a hand), location, and movement. Third, with recent hardware improvements in depth sensors and processing units, a hand gesture input offers sufficient accuracy such that the system's complexity can be reduced over other inputs such as handheld controllers, which employ various sensors such as electromagnetic tracking emitters/receivers.

For wearable systems, hand tracking using a TOF sensor can be prohibitive in many instances due to the significant amount of power consumed due to the TOF sensor. As such, new systems, methods, and other techniques are needed to improve the power efficiency of TOF sensors.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of operating a time-of-flight (TOF) sensor, the method comprising: operating in a low power mode by repeatedly performing a low power mode sequence, wherein performing the low power mode sequence includes: performing a depth frame, wherein performing the depth frame includes emitting light pulses, detecting reflected light pulses, and computing a depth map based on the detected reflected light pulses; and performing an amplitude frame at least one time, wherein performing the amplitude frame includes emitting a light pulse, detecting a reflected light pulse, and computing an amplitude map based on the detected reflected light pulse; determining that an activation condition is satisfied; and in response to determining that the activation condition is satisfied, switching from operating in the low power mode to operating in a high accuracy mode by repeatedly performing a high accuracy mode sequence, wherein performing the high accuracy mode sequence includes: performing the depth frame multiple times.

Example 2 is the method of example(s) 1, wherein performing the depth frame further includes: computing three-dimensional (3D) positions of a plurality of keypoints along a target object based on the depth map.

Example 3 is the method of example(s) 2, wherein the target object is a user's hand.

Example 4 is the method of example(s) 3, wherein determining that the activation condition is satisfied includes: determining that the user's hand is currently interacting or is about to interact in a Z dimension.

Example 5 is the method of example(s) 2, wherein performing the amplitude frame further includes: computing two-dimensional (2D) positions of the plurality of keypoints along the target object based on the amplitude map.

Example 6 is the method of example(s) 5, wherein performing the amplitude frame further includes: estimating the 3D positions of the plurality of keypoints along the target object based on the 2D positions of the plurality of keypoints.

Example 7 is the method of example(s) 6, wherein the 3D positions of the plurality of keypoints are estimated further based on the depth map.

Example 8 is a system for operating a time-of-flight (TOF) sensor, the system comprising: one or more processors; and a computer-readable medium comprising instructions that, when executed by the one or more processors, cause the one or more processors to perform operations comprising: operating in a low power mode by repeatedly performing a low power mode sequence, wherein performing the low power mode sequence includes: performing a depth frame, wherein performing the depth frame includes emitting light pulses, detecting reflected light pulses, and computing a depth map based on the detected reflected light pulses; and performing an amplitude frame at least one time, wherein performing the amplitude frame includes emitting a light pulse, detecting a reflected light pulse, and computing an amplitude map based on the detected reflected light pulse; determining that an activation condition is satisfied; and in response to determining that the activation condition is satisfied, switching from operating in the low power mode to operating in a high accuracy mode by repeatedly performing a high accuracy mode sequence, wherein performing the high accuracy mode sequence includes: performing the depth frame multiple times.

Example 9 is the system of example(s) 8, wherein performing the depth frame further includes: computing three-dimensional (3D) positions of a plurality of keypoints along a target object based on the depth map.

Example 10 is the system of example(s) 9, wherein the target object is a user's hand.

Example 11 is the system of example(s) 10, wherein determining that the activation condition is satisfied includes: determining that the user's hand is currently interacting or is about to interact in a Z dimension.

Example 12 is the system of example(s) 9, wherein performing the amplitude frame further includes: computing two-dimensional (2D) positions of the plurality of keypoints along the target object based on the amplitude map.

Example 13 is the system of example(s) 12, wherein performing the amplitude frame further includes: estimating the 3D positions of the plurality of keypoints along the target object based on the 2D positions of the plurality of keypoints.

Example 14 is the system of example(s) 13, wherein the 3D positions of the plurality of keypoints are estimated further based on the depth map.

Example 15 is a non-transitory computer-readable medium comprising instructions that, when executed by one or more processors, cause the one or more processors to perform operations for operating a time-of-flight (TOF) sensor, the operations comprising: operating in a low power mode by repeatedly performing a low power mode sequence, wherein performing the low power mode sequence includes: performing a depth frame, wherein performing the depth frame includes emitting light pulses, detecting reflected light pulses, and computing a depth map based on the detected reflected light pulses; and performing an amplitude frame at least one time, wherein performing the amplitude frame includes emitting a light pulse, detecting a reflected light pulse, and computing an amplitude map based on the detected reflected light pulse; determining that an activation condition is satisfied; and in response to determining that the activation condition is satisfied, switching from operating in the low power mode to operating in a high accuracy mode by repeatedly performing a high accuracy mode sequence, wherein performing the high accuracy mode sequence includes: performing the depth frame multiple times.

Example 16 is the non-transitory computer-readable medium of example(s) 15, wherein performing the depth frame further includes: computing three-dimensional (3D) positions of a plurality of keypoints along a target object based on the depth map.

Example 17 is the non-transitory computer-readable medium of example(s) 16, wherein the target object is a user's hand.

Example 18 is the non-transitory computer-readable medium of example(s) 17, wherein determining that the activation condition is satisfied includes: determining that the user's hand is currently interacting or is about to interact in a Z dimension.

Example 19 is the non-transitory computer-readable medium of example(s) 16, wherein performing the amplitude frame further includes: computing two-dimensional (2D) positions of the plurality of keypoints along the target object based on the amplitude map.

Example 20 is the non-transitory computer-readable medium of example(s) 19, wherein performing the amplitude frame further includes: estimating the 3D positions of the plurality of keypoints along the target object based on the 2D positions of the plurality of keypoints.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF SPECIFIC EMBODIMENTS

Embodiments described herein relate to systems, methods, and other techniques for improving the power efficiency of hand tracking sensors used in wearable systems, such as augmented reality (AR), virtual reality (VR), or mixed reality (MR) systems. In some embodiments, hand tracking sensors comprise time-of-flight (TOF) sensors, which emit light, detect reflected light, and determine distances from objects based on a comparison between the emitted and detected light (e.g., based the time difference).

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
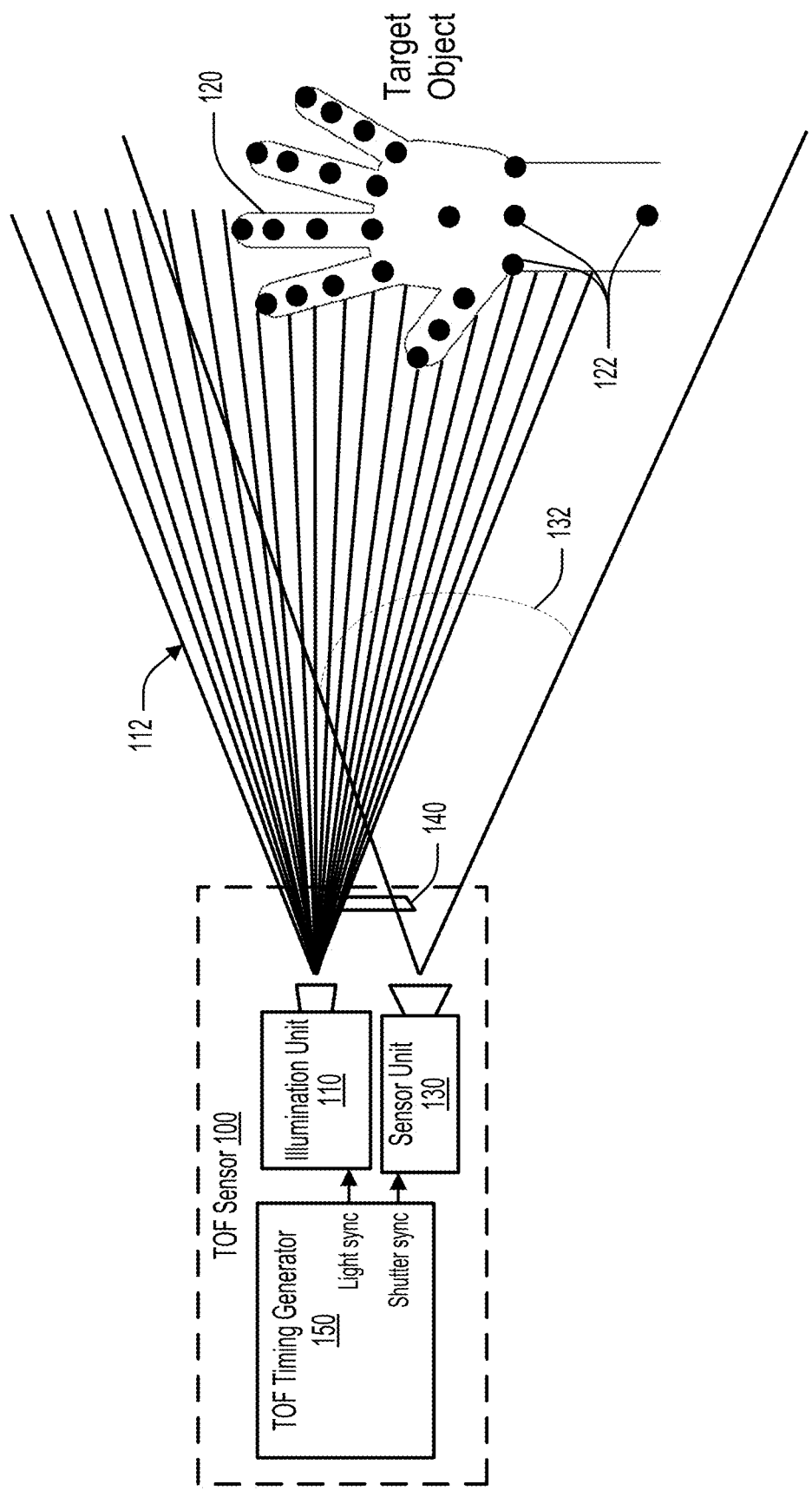
FIG. 1 illustrates an example of a TOF sensor for depth measurement.

FIG. 1 illustrates an example of a TOF sensor 100 for depth measurement, in accordance with some embodiments of the present disclosure. In the illustrated example, TOF sensor 100 (also referred to as a TOF camera) includes an illumination unit 110 to transmit light pulses 112 to illuminate a target object 120 for determining a distance to the target object. Illumination unit 110 may be a pulsed illumination unit that includes optics for emitting light pulses 112 toward target object 120. In this example, illumination unit 110 is configured to transmit light to target object 120 using, for example, a laser light source. However, it is understood that other sources of electromagnetic radiation can also be used, for example, infra-red (IR) light, radio frequency electromagnetic (EM) waves, etc.

TOF sensor 100 may include a sensor unit 130, which may be a gated sensor unit including a light-sensitive pixel array to receive optical signals from the light pulses in a field of view (FOV) 132 of sensor unit 130. The pixel array may include an active region and a feedback region. TOF sensor 100 may also include an optical feedback device 140 for directing a portion of the light from illumination unit 110 to the feedback region of the pixel array. Optical feedback device 140 may provide a preset reference depth. The preset reference depth can be a fixed TOF length, which can be used to produce a look up table (LUT) that correlates sensed light vs. depth measurement. In some embodiments, optical feedback device 140 can fold a direct light from illumination unit 110 into FOV 132 of the lens in sensor unit 130. TOF sensor 100 may further include a TOF timing generator 150 for providing light synchronization and shutter synchronization signals to illumination unit 110 and sensor unit 130.

In various embodiments, TOF sensor 100 may be configured to transmit light pulses to illuminate target object 120. Imaging system 100 may also be configured to sense, in the feedback region of the pixel array, light from optical feedback device 140, using a sequence of shutter windows that include delay times representing a range of depth. The range of depth can include the entire range of distances that can be determined by the imaging system. TOF sensor 100 may calibrate TOF depth measurement reference information based on the sensed light in the feedback region of the pixel array. TOF sensor 100 may be further configured to sense, in the active region of the light-sensitive pixel array, light reflected from target object 120, and to determine the distance of target object 120 based on the sensed reflected light and the calibrated TOF measurement reference information.

In the illustrated example, target object 120 includes a user's hand, which may be the case when TOF sensor 100 is used in a hand tracking application. One approach to recognizing hand gestures is to track the positions of various keypoints 122 on one or both of the user's hands. In one implementation, a hand tracking system may identify the 3D positions of over 20 keypoints on each hand. Next, a gesture or pose associated with the hand may be recognized by analyzing keypoints 122. For example, the distances between different keypoints may be indicative of whether a user's hand is in a first (e.g., a low average distance) or is open and relaxed (e.g., a high average distance). As another example, various angles formed by 3 or more keypoints (e.g., including at least 1 keypoint along the user's index finger) may be indicative of whether a user's hand is pointing or pinching.

Figure 2:
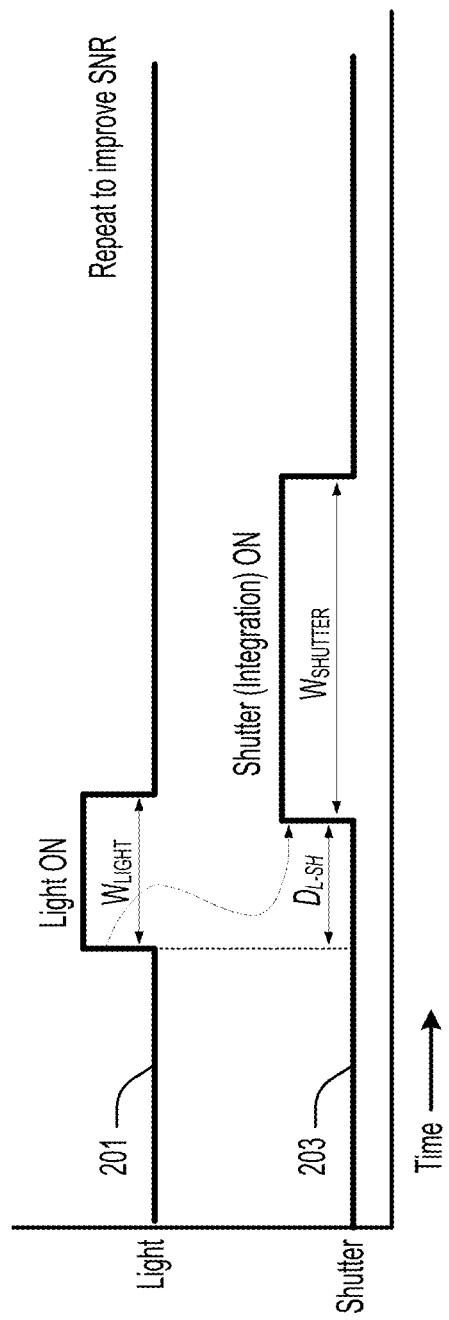
FIG. 2 illustrates an example timing diagram for performing a TOF depth measurement.

FIG. 2 illustrates an example timing diagram for performing a TOF depth measurement, in accordance with some embodiments of the present disclosure. In the illustrated example, the horizontal axis is time and the vertical axis is the intensity or magnitude of the light and shutter signals. Waveform 201 represents a light pulse being emitted by the sensor, which can then be reflected from the target object or provided by the feedback optical device. Waveform 203 represents the shutter window. It can be seen that the light pulse has a width $W_{LIGHT}$, and the shutter window has a width of $W_{SHUTTER}$. Further, there is a time delay between the leading edge of the light and the shutter, DL-SH. It can be seen that the amount of light sensed by the sensor varies with the relative delay of the shutter with respect to the light. As described herein, activations of both the light and shutter signals may occur within what may be referred to below as an illuminated subframe, and activation of only the shutter signal may occur within what may be referred to below as an intensity subframe.

Figure 3:
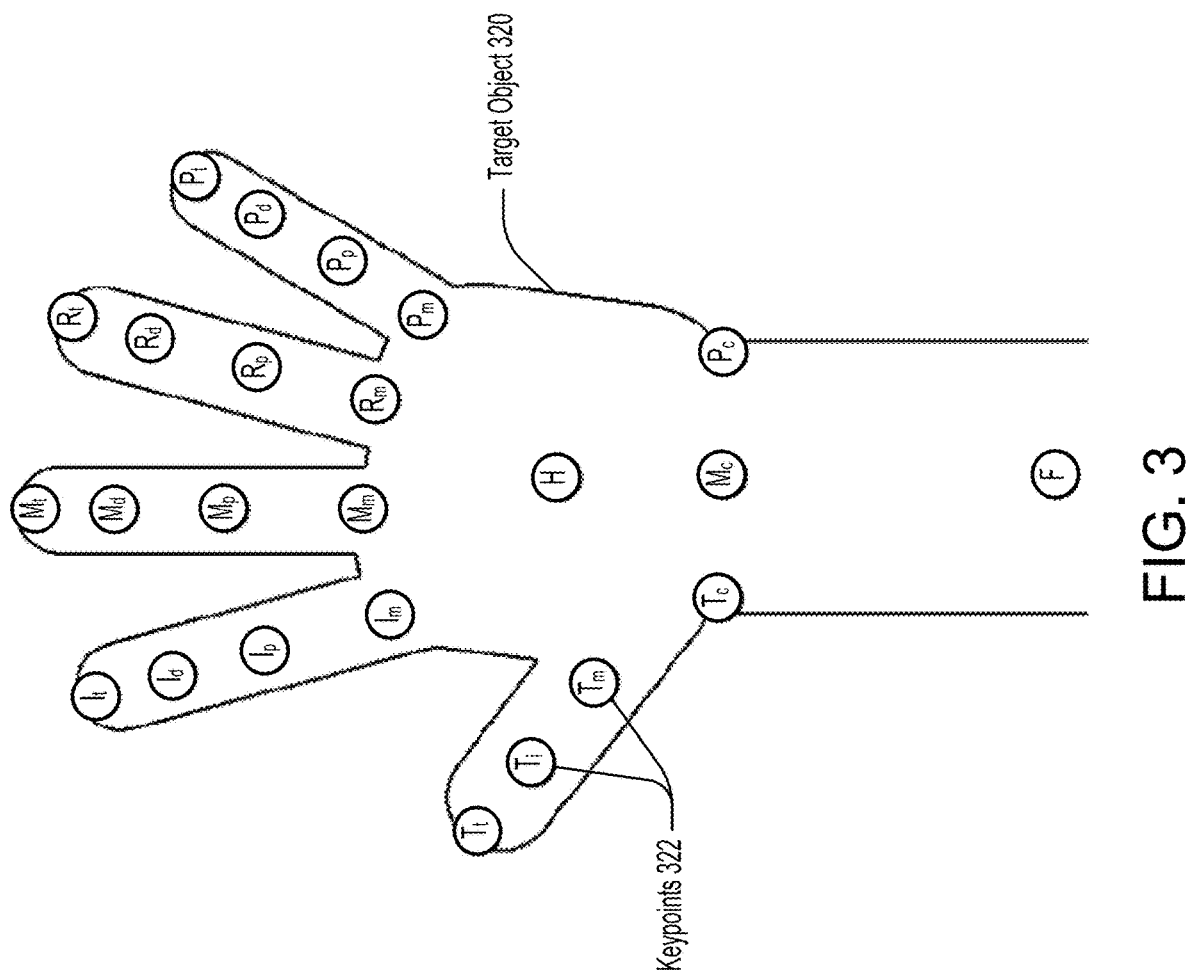
FIG. 3 illustrates an example of various keypoints associated with a target object that may be detected or tracked using a TOF sensor.

FIG. 3 illustrates an example of various keypoints 322 associated with a target object 320 that may be detected or tracked using a TOF sensor, in accordance with some embodiments of the present disclosure. In various embodiments, the 2D or 3D positions of keypoints 322 may be computed. For example, as is described herein, during a high accuracy or high power mode, the 3D positions of keypoints 322 may be computed directly using a depth map captured by the TOF sensor. As another example, as is described herein, during a low accuracy or low power mode, the 2D positions of keypoints 322 may be computed using an amplitude map captured by the TOF sensor, which may be used to estimate the 3D positions of keypoints 322.

In the illustrated example, target object 320 includes a user's hand. For each of keypoints 322, uppercase characters correspond to the region of the hand as follows: "T" corresponds to the thumb, "I" corresponds to the index finger, "M" corresponds to the middle finger, "R" corresponds to the ring finger, "P" corresponds to the pinky, "H" corresponds to the hand, and "F" corresponds to the forearm. Lowercase characters correspond to a more specific location within each region of the hand as follows: "t" corresponds to the tip (e.g., the fingertip), "i" corresponds to the interphalangeal joint ("IP joint"), "d" corresponds to the distal interphalangeal joint ("DIP joint"), "p" corresponds to the proximal interphalangeal joint ("PIP joint"), "m" corresponds to the metacarpophalangeal joint ("MCP joint"), and "c" corresponds to the carpometacarpal joint ("CMC joint").

Figure 4:
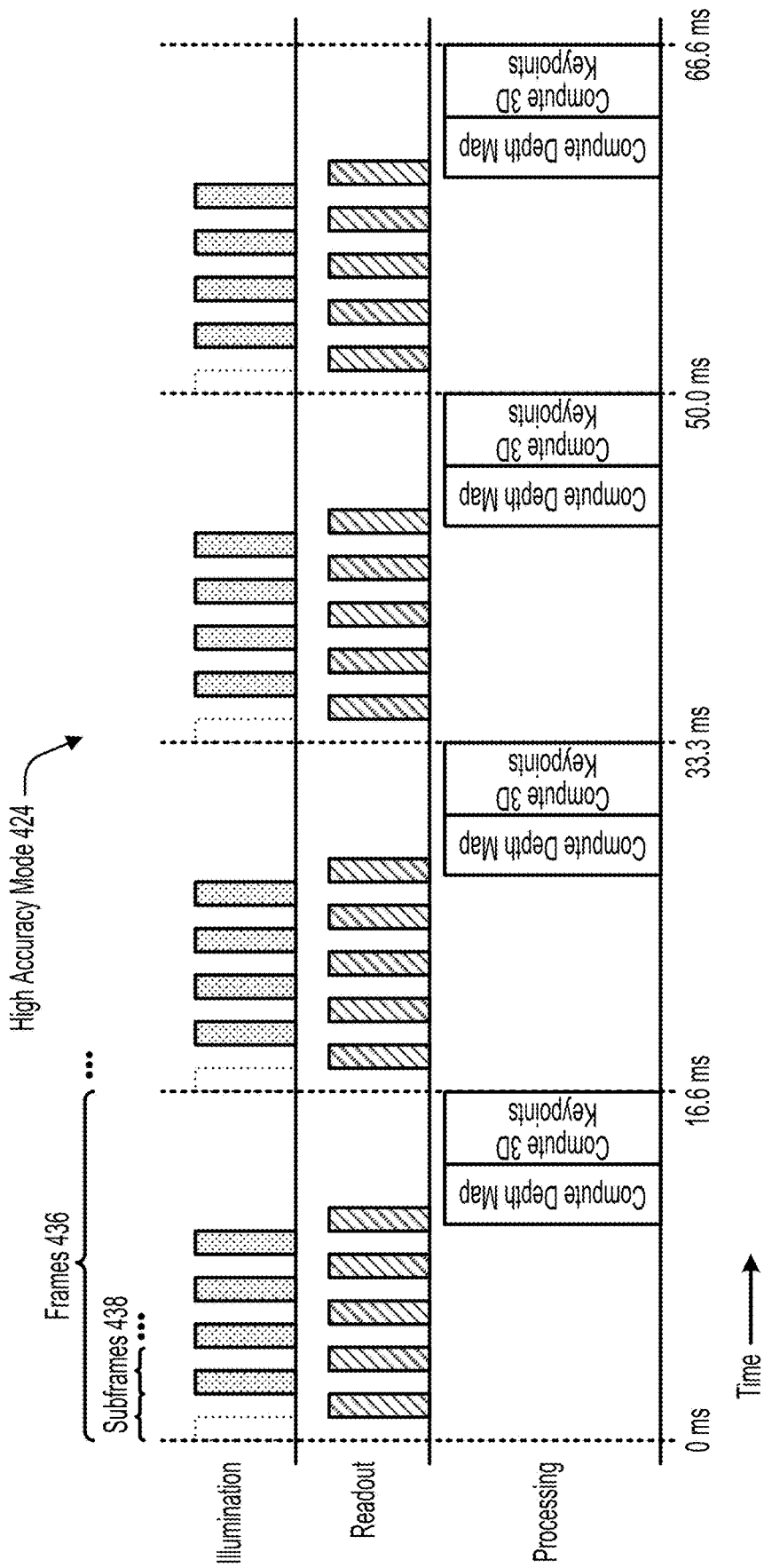
FIG. 4 illustrates an example timing diagram for a high accuracy mode.

FIG. 4 illustrates an example timing diagram for a high accuracy mode 424, in accordance with some embodiments of the present disclosure. High accuracy mode 424 may alternatively be referred to as a high power mode or a high Z accuracy mode. While operating in accordance with high accuracy mode 424, the TOF sensor may compute 3D keypoints during each of one or more frames 436. For example, during a first frame of frames 436 between 0 and 16.6 ms, the TOF sensor may repeatedly emit light pulses and detect the reflected light (as indicated by the activations on the "Illumination" track) and, after each detection, send the captured sensor data to a processor for processing (as indicated by the activations on the "Readout" track). For example, during each of subframes 438, the TOF sensor may emit a light pulse, detect the reflected light (with the illumination unit and the sensor unit being kept in sync by the TOF timing generator), and send the captured sensor data (indicative of the detected reflected light) to a processor. These subframes may be referred to as illuminated subframes.

In some instances, each of frames 436 may include a subframe in which the light emitting portion of the illumination step is skipped by disabling the light source so that the TOF sensor can collect ambient information of the environment. This ambient information can be subtracted from the illuminated subframes to remove any fixed pattern noise. This non-illuminated subframe may be referred to as an intensity subframe. In the illustrated example, each of frames 436 includes one intensity subframe followed by four illuminated subframes. In some embodiments, the intensity subframe may be skipped for certain frames and the ambient information from a previous frame may be used to remove noise.

During high accuracy mode 424, after multiple illuminated subframes during a particular frame, the data captured during the illuminated subframes (and optionally the intensity subframe) may be sent to a processing unit to process the data to compute a depth map of the environment. In some embodiments, the depth map may be computed by converting a native depth distance, which may be a radial distance, into a Z distance. As such, in some embodiments, a radial to distance (R2D) algorithm may be performed to convert radial distance into Z distance.

After computing the depth map during a particular frame, the depth map may be analyzed to compute 3D keypoints of a target object (e.g., the user's hand). Computing the 3D keypoints may include computing 3D positions for the keypoints (i.e., calculating a 3D position for each of the keypoints). The 3D keypoints computed during each of frames 436 may also be referred to as high accuracy 3D keypoints since they are computed directly from the depth map. In some embodiments, each of frames 436 may be referred to as depth map frames as they include 3D keypoints computed based on a depth map computed in the same frame.

Figure 5:
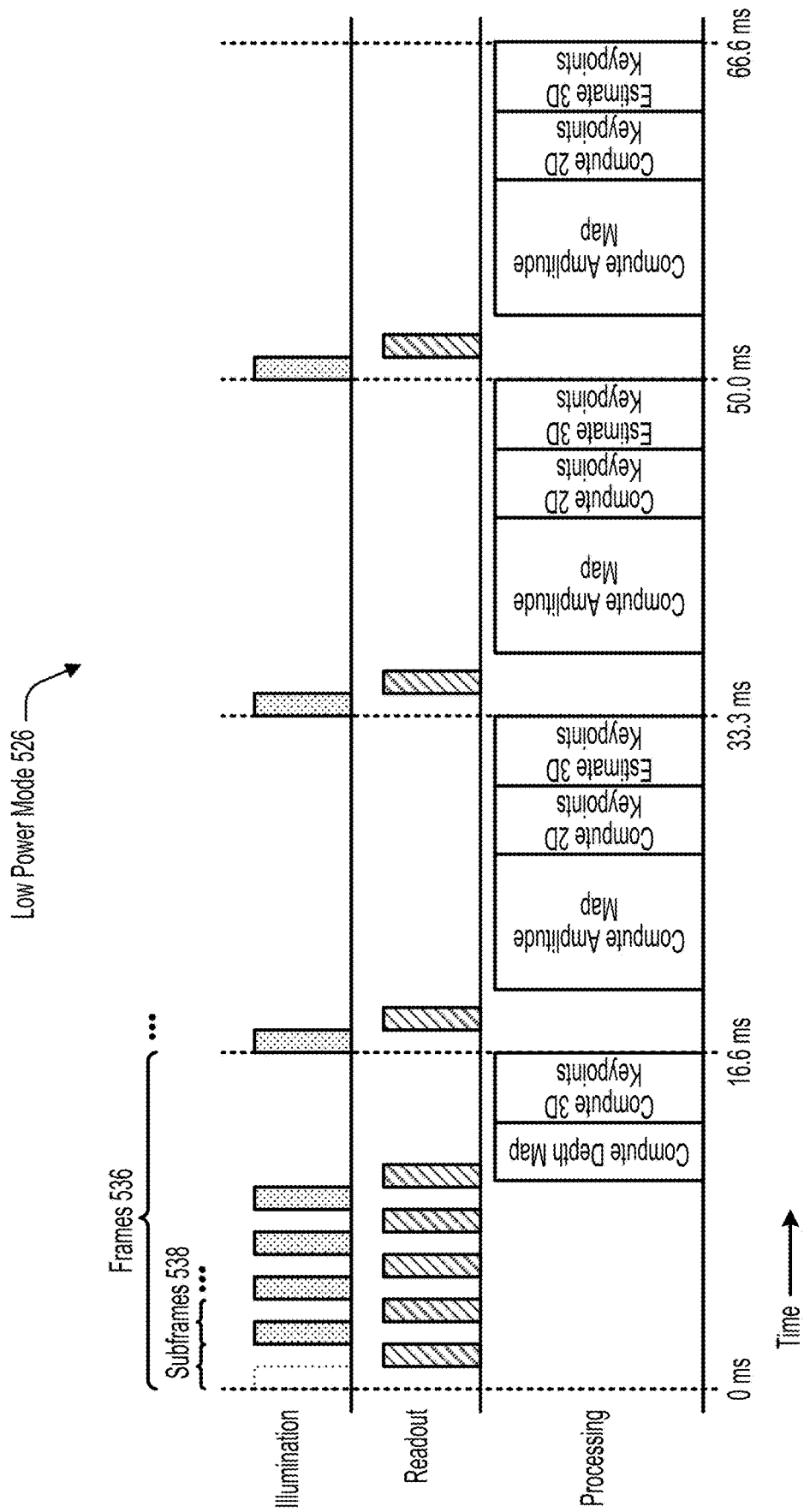
FIG. 5 illustrates an example timing diagram for a low power mode.

FIG. 5 illustrates an example timing diagram for a low power mode 526, in accordance with some embodiments of the present disclosure. Low power mode 526 may alternatively be referred to as a low accuracy mode or a low Z accuracy mode. While operating in accordance with low power mode 526, the TOF sensor may compute 3D keypoints during a depth map frame (similar to that described above in reference to the high accuracy mode), which may be a first frame of frames 536. Thereafter, the TOF sensor may estimate 3D keypoints during each of multiple frames referred to as amplitude frames.

For example, during a first frame of frames 536 between 0 and 16.6 ms, the TOF sensor may perform a depth frame by repeatedly emitting light pulses and detecting the reflected light (as indicated by the activations on the "Illumination" track), and sending the captured sensor data to a processor for processing (as indicated by the activations on the "Readout" track) during multiple subframes 538. The data captured during these illuminated subframes (and optionally an intensity subframe) may be sent to a processing unit to process the data to compute a depth map of the environment.

During a second frame of frames 536 between 16.6 ms and 33.3 ms, the TOF sensor may perform an amplitude frame by performing one illuminated subframe to capture data for computing an amplitude map of the environment. In some embodiments, the amplitude map may be an IR amplitude image that does not include depth information. The amplitude map may be used to compute 2D keypoints of the target object. Computing the 2D keypoints may include computing 2D positions for the keypoints (i.e., calculating a 2D position for each of the keypoints). In some embodiments, a machine learning model, such as a neural network, may be trained to generate 2D keypoints based on an input amplitude map.

The 2D keypoints computed during the amplitude frame may then be used to estimate 3D keypoints. In some embodiments, the 2D keypoints may be used to query the computed depth map of the most recent frame. For example, during the second frame of frames 536, the 3D keypoints may be estimated by querying the depth map computed during the first frame using the 2D keypoints computed during the second frame. The 3D keypoints computed during the second frame of frames 536 (as well as those computed during the third and fourth frames) may be referred to as low accuracy 3D keypoints since they are estimated based on 2D keypoints and a depth map computed during a previous frame.

Figure 6A:
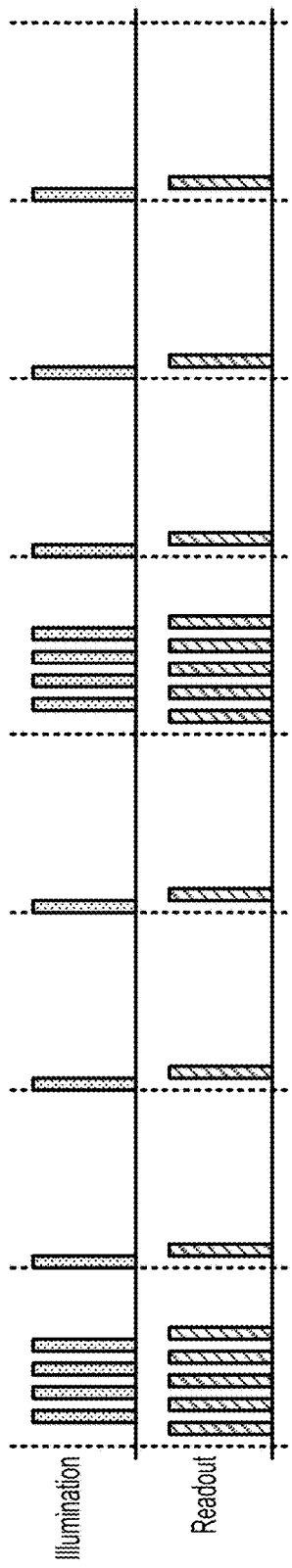
FIGS. 6A-6C illustrate various example timing diagrams for a low power mode.
Figure 6B:
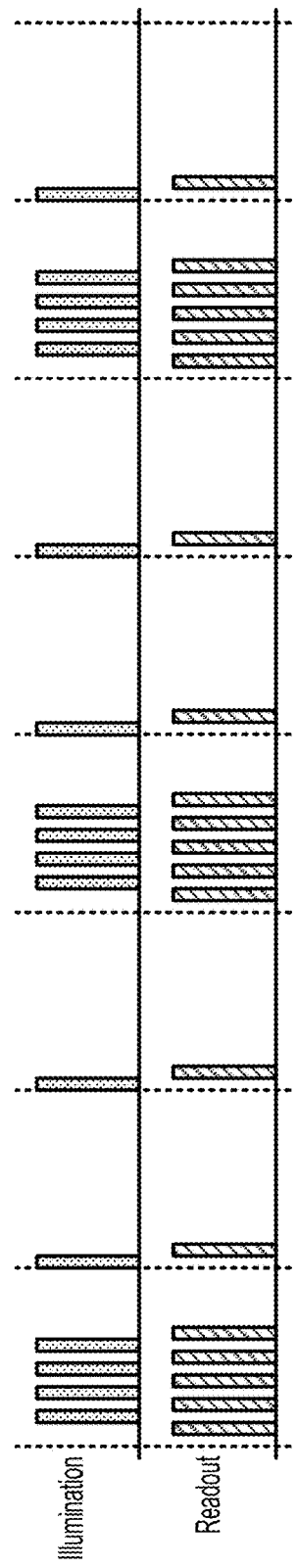
Figure 6C:
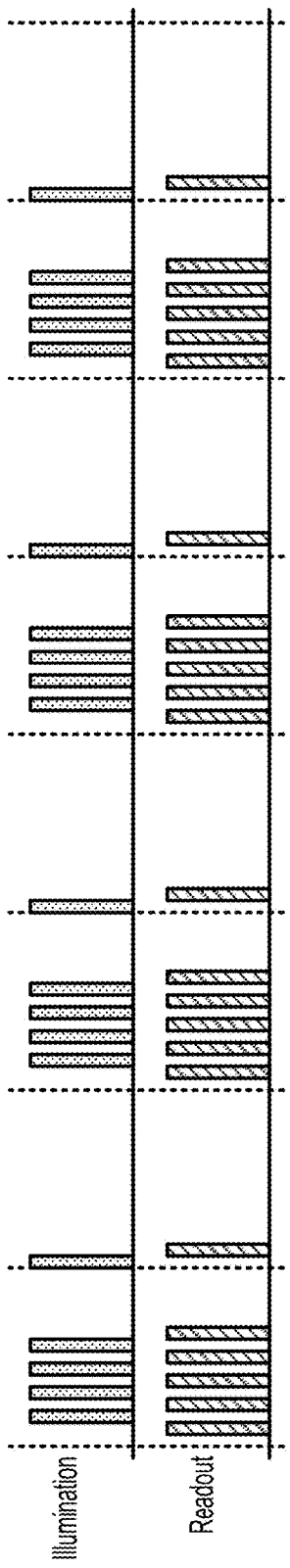

FIGS. 6A-6C illustrate various example timing diagrams for a low power mode, in accordance with some embodiments of the present disclosure. In FIG. 6A, the low power mode sequence includes one depth frame followed by three amplitude frames. In FIG. 6B, the low power mode sequence includes one depth frame followed by two amplitude frames. In FIG. 6C, the low power mode sequence includes one depth frame followed by one amplitude frame. Each of the above-described sequences in FIGS. 6A-6C may be repeated multiple times while the TOF sensor is operating in the low power mode. In some instances, the TOF sensor may switch between the different sequences in FIGS. 6A-6C based on a desired power setting, which may be inputted by a user or determined by a power management system.

Figure 7:
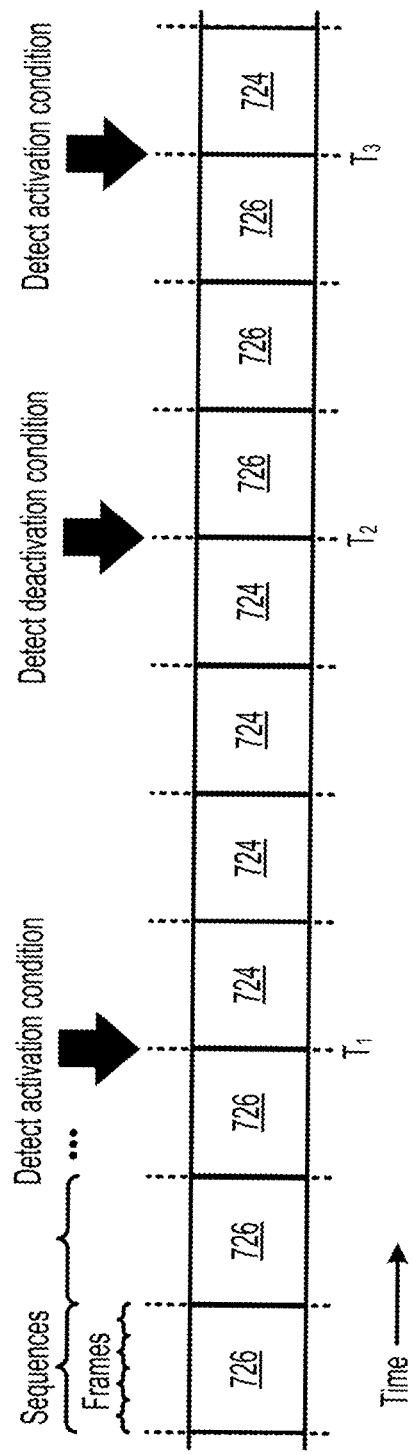
FIG. 7 illustrates an example timing diagram of a TOF sensor switching between a low power mode and a high accuracy mode.

FIG. 7 illustrates an example timing diagram of a TOF sensor switching between a low power mode and a high accuracy mode, in accordance with some embodiments of the present disclosure. While operating in the low power mode, the TOF sensor repeatedly performs a low power mode sequence 726, which includes one depth frame followed by one or more amplitude frames, as described in reference to FIGS. 5 and 6A-6C. While operating in the high accuracy mode, the TOF sensor repeatedly performs a high accuracy mode sequence 724, which includes multiple depth frames, as described in reference to FIG. 4.

In the illustrated example, the TOF sensor begins operating in the low power mode by repeatedly performing low power mode sequences 726. At time $T_1$, the TOF sensor detects that an activation condition has been satisfied. In response, the TOF sensor switches from the low power mode to the high accuracy mode and begins repeatedly performing high accuracy mode sequences 724. At time $T_2$, the TOF sensor detects that a deactivation condition has been satisfied (or that the activation condition is no longer satisfied). In response, the TOF sensor switches from the high accuracy mode to the low power mode and begins repeatedly performing low power mode sequences 726. At time $T_3$, the TOF sensor detects that the activation condition has been satisfied (or that the deactivation condition is no longer satisfied). In response, the TOF sensor switches from the low power mode to the high accuracy mode and begins repeatedly performing high accuracy mode sequences 724.

Figure 8:
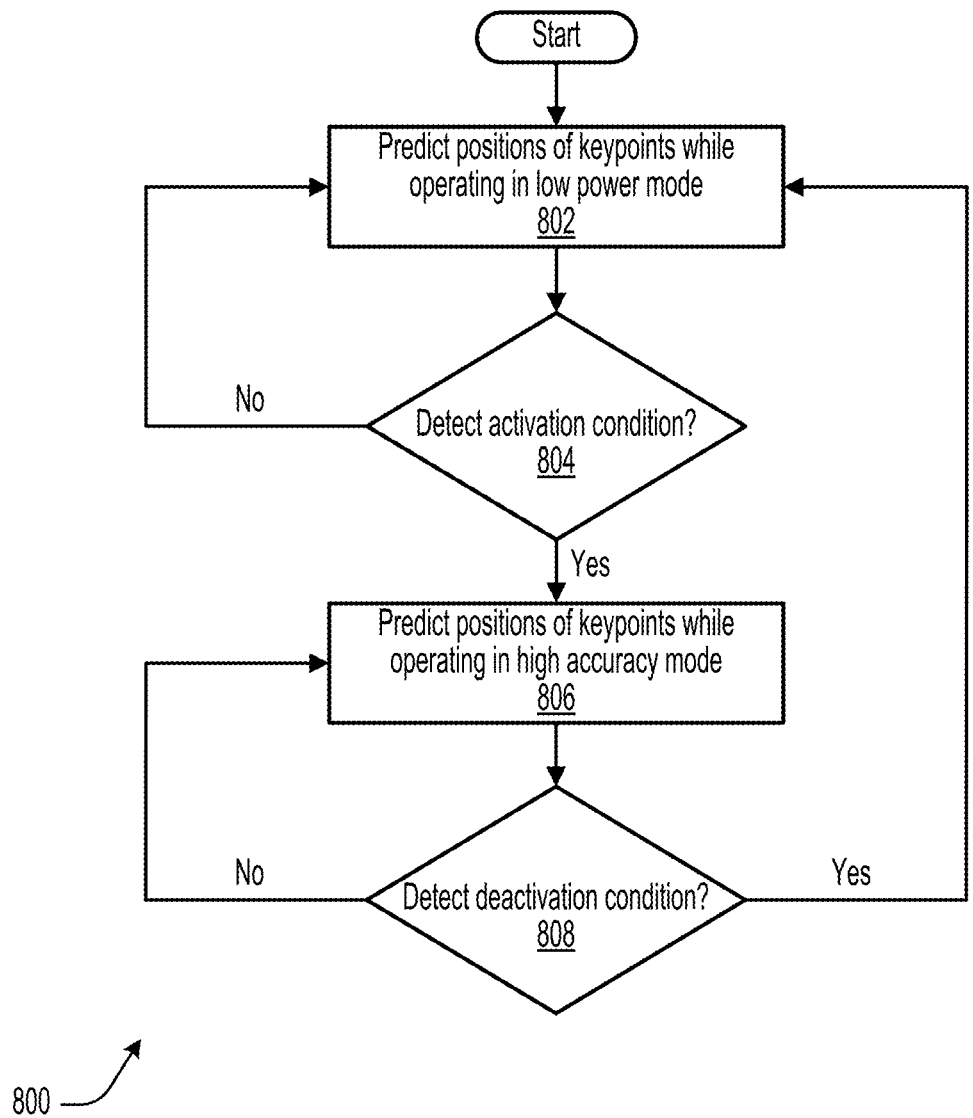
FIG. 8 illustrates an example method of predicting keypoints of a target object.

FIG. 8 illustrates an example method 800 of predicting keypoints of a target object, in accordance with some embodiments of the present disclosure. One or more steps of method 800 may be omitted during performance of method 800, and steps of method 800 may be performed in any order and/or in parallel. One or more steps of method 800 may be performed by one or more processors. Method 800 may be implemented as a computer-readable medium or computer program product comprising instructions which, when the program is executed by one or more computers, cause the one or more computers to carry out the steps of method 800.

At step 802, positions of keypoints are predicted while a TOF sensor is operating in a low power mode. The positions of the keypoints predicted at step 802 may be 2D or 3D positions.

At step 804, it is determined whether an activation condition is detected. If the activation condition is not detected, method 800 returns to step 802. If the activation condition is detected, method 800 proceeds to step 806.

At step 806, the 3D positions of the keypoints are predicted while the TOF sensor is operating in a high accuracy mode.

At step 808, it is determined whether a deactivation condition is detected. If the deactivation condition is not detected, method 800 returns to step 806. If the deactivation condition is detected, method 800 returns to step 802.

Figure 9:
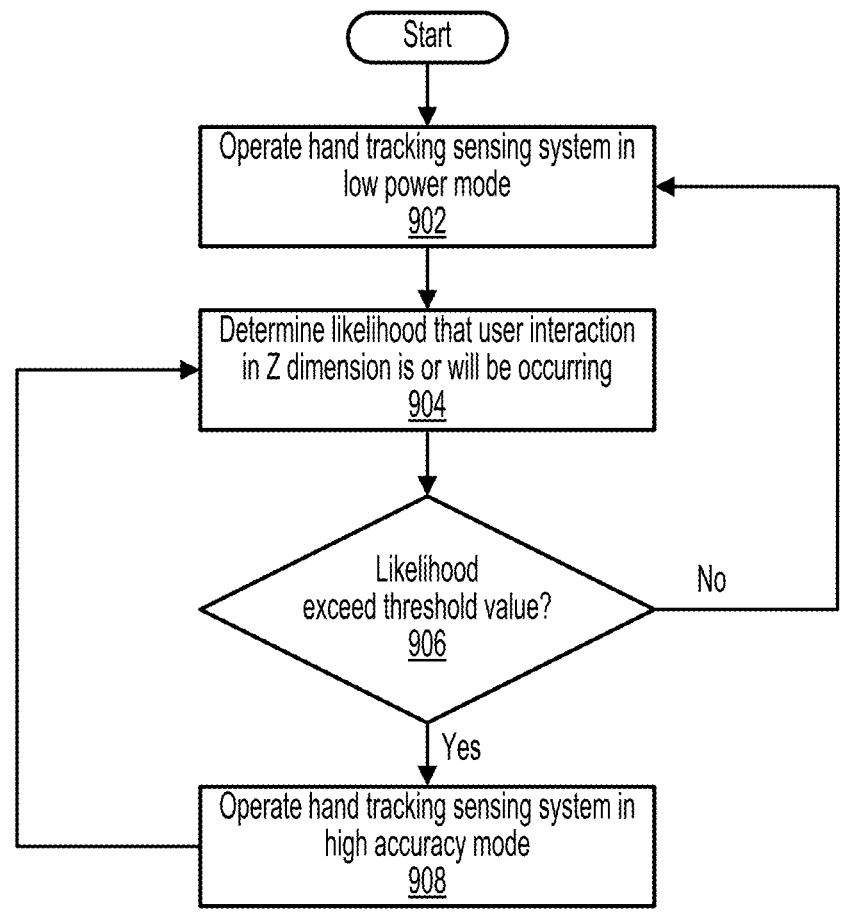
FIG. 9 illustrates an example method of operating a TOF sensor of a hand tracking sensing system.

FIG. 9 illustrates an example method 900 of operating a hand tracking sensing system that includes a TOF sensor, in accordance with some embodiments of the present disclosure. One or more steps of method 900 may be omitted during performance of method 900, and steps of method 900 may be performed in any order and/or in parallel. One or more steps of method 900 may be performed by one or more processors. Method 900 may be implemented as a computer-readable medium or computer program product comprising instructions which, when the program is executed by one or more computers, cause the one or more computers to carry out the steps of method 900.

At step 902, the hand tracking sensing system (including the TOF sensor) is operated in a low power mode.

At step 904, a likelihood that a user interaction in a Z dimension is or will be occurring is determined. The likelihood may be a value between 0 and 1.

At step 906, it is determined whether the likelihood exceeds a threshold value. The threshold value may be between 0 and 1. If it is determined that the likelihood does not exceed the threshold value, method 900 returns to step 902. If it is determined that the likelihood exceeds the threshold value, method 900 proceeds to step 908.

At step 908, the hand tracking sensing system (including the TOF sensor) is operated in a high accuracy mode. After and/or concurrently with performing step 908, method 900 may return to step 904.

Figure 10:
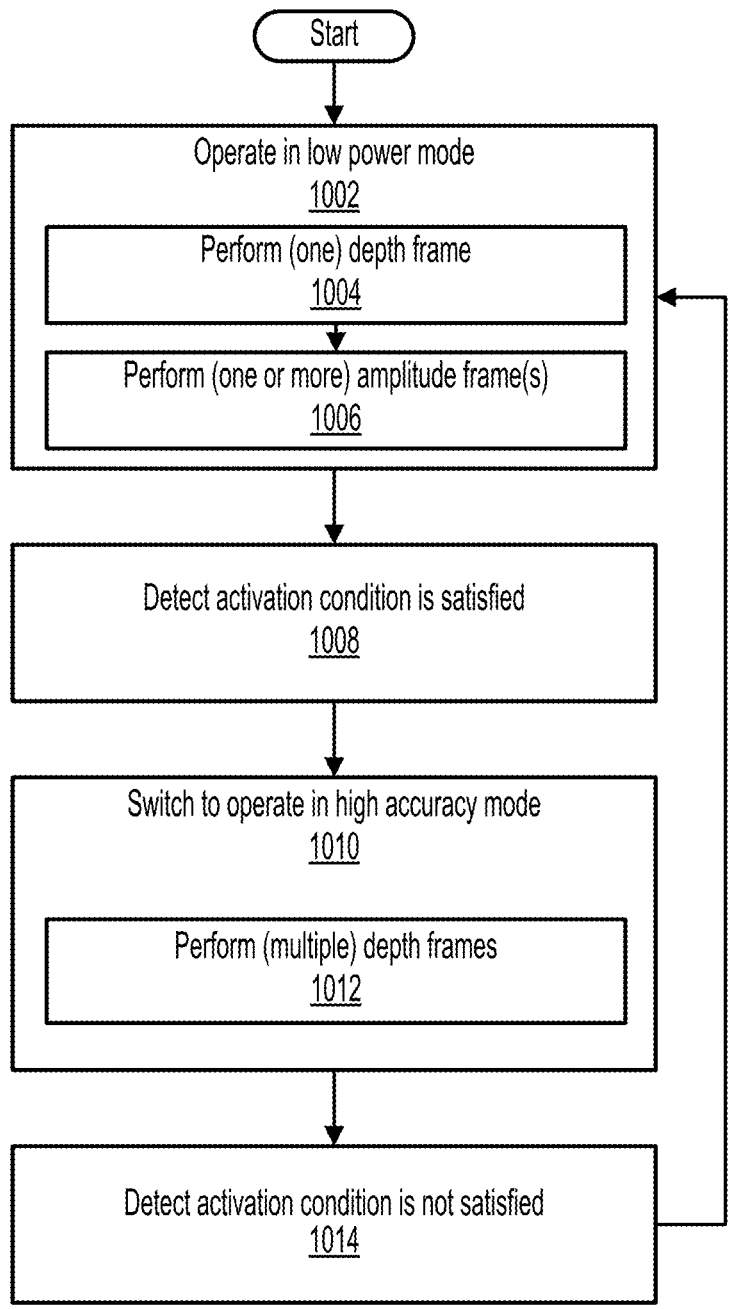
FIG. 10 illustrates an example method of operating a TOF sensor.

FIG. 10 illustrates an example method 1000 of operating a TOF sensor, in accordance with some embodiments of the present disclosure. One or more steps of method 1000 may be omitted during performance of method 1000, and steps of method 1000 may be performed in any order and/or in parallel. One or more steps of method 1000 may be performed by one or more processors. Method 1000 may be implemented as a computer-readable medium or computer program product comprising instructions which, when the program is executed by one or more computers, cause the one or more computers to carry out the steps of method 1000.

At step 1002, a TOF sensor (e.g., TOF sensor 100) is operated in a low power mode (e.g., low power mode 526). The TOF sensor may be operated in the low power mode by repeatedly performing a low power mode sequence (e.g., low power mode sequence 726). Performing the low power mode sequence may include, at step 1004, performing a depth frame (e.g., first frame of frames 536) and, at step 1006, performing an amplitude frame (e.g., second frame of frames 536) at least one time. Performing the depth frame may include emitting light pulses (e.g., light pulses 112), detecting reflected light pulses, and computing a depth map based on the detected reflected light pulses. Performing the amplitude frame may include emitting a light pulse, detecting a reflected light pulse, and computing an amplitude map based on the detected reflected light pulse.

In some embodiments, performing the depth frame may include computing 3D positions of a plurality of keypoints (e.g., keypoints 122, 322) along a target object (e.g., target objects 120, 320) based on the depth map. The target object may be a user's hand. In some embodiments, performing the amplitude frame may include computing 2D positions of the plurality of keypoints along the target object based on the amplitude map. In some embodiments, performing the amplitude frame may include estimating the 3D positions of the plurality of keypoints along the target object based on the 2D positions of the plurality of keypoints. In some embodiments, the 3D positions of the plurality of keypoints may be estimated further based on the most recently calculated depth map. In some embodiments, the 3D positions of the plurality of keypoints computed during the depth frame may be referred to as high accuracy 3D positions, and the 3D positions of the plurality of keypoints estimated during the amplitude frame may be referred to as low accuracy 3D positions.

In some embodiments, the low power mode sequence may include one depth frame and one amplitude frame. In some embodiments the low power mode sequence may include one depth frame and multiple amplitude frames. In some embodiments, the low power mode sequence may include one or more depth frames and one or more amplitude frames. In some embodiments the number of depth frames and/or the number of amplitude frames may be adjusted in real time by a user or by a power management system.

At step 1008, it is determined that an activation condition is satisfied. In some embodiments, determining that the activation condition is satisfied may include determining that the user's hand is currently interacting or is about to interact in a Z dimension. In some embodiments, determining that the activation condition is satisfied may include determining that the user's hand is currently in the FOV of the TOF sensor or is near the center (away from the edge) of the FOV of the TOF sensor. In some embodiments, determining that the activation condition is satisfied may include determining that a power level associated with the TOF sensor is below a threshold. In some embodiments, determining that the activation condition is satisfied may include receiving a user input indicating a switch from the low power mode to a high accuracy mode. In response to determining that the activation condition is satisfied, method 1000 may proceed step 1010.

At step 1010, the TOF sensor is switched from operating in the low power mode to operating in a high accuracy mode. The TOF sensor may be operated in the high accuracy mode by repeatedly performing a high accuracy mode sequence. Performing the high accuracy mode sequence may include, at step 1012, performing the depth frame multiple times.

At step 1014, it is determined that the activation condition is not satisfied. Optionally, in some embodiments, determining that the activation condition is not satisfied may include determining that a deactivation condition is satisfied. In some embodiments, determining that the activation condition is not satisfied may include determining that the user's hand is not currently interacting or is not about to interact in a Z dimension. In some embodiments, determining that the activation condition is not satisfied may include determining that the user's hand is not currently in the FOV of the TOF sensor or is not near the center of the FOV of the TOF sensor. In response to determining that the activation condition is not satisfied, method 1000 may return to step 1002.

Figure 11:
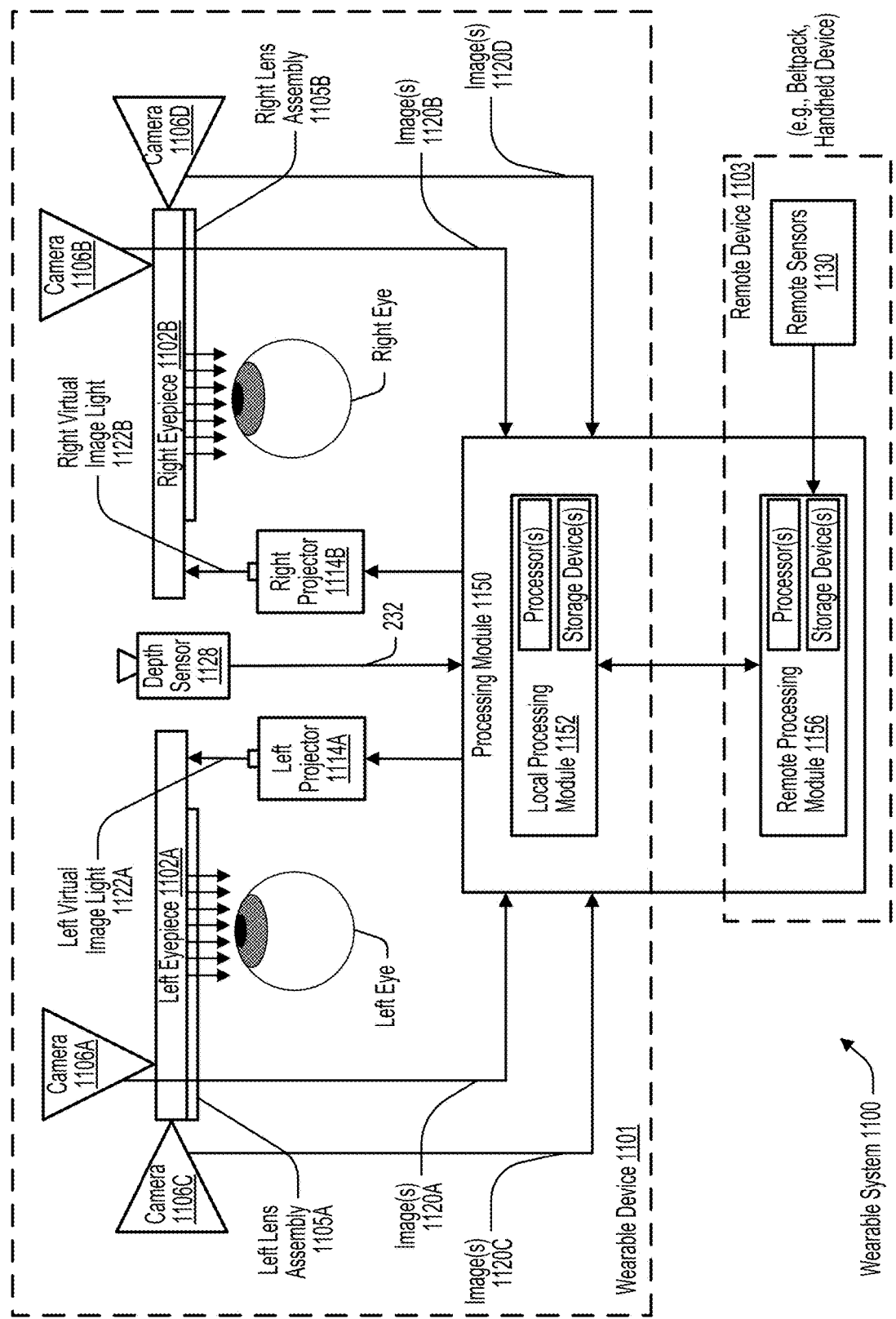
FIG. 11 illustrates a schematic view of an example wearable system that may include a TOF sensor for performing power-efficient hand tracking.

FIG. 11 illustrates a schematic view of an example AR/VR/MR wearable system 1100 that may include a TOF sensor 1128 for performing power-efficient hand tracking, according to some embodiments of the present disclosure. Wearable system 1100 may include a wearable device 1101 and at least one remote device 1103 that is remote from wearable device 1101 (e.g., separate hardware but communicatively coupled). While wearable device 1101 is worn by a user (generally as a headset), remote device 1103 may be held by the user (e.g., as a handheld controller) or mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Wearable device 1101 may include a left eyepiece 1102A and a left lens assembly 1105A arranged in a side-by-side configuration and a right eyepiece 1102B and a right lens assembly 1105B also arranged in a side-by-side configuration. In some embodiments, wearable device 1101 includes one or more sensors including, but not limited to: a left front-facing world camera 1106A attached directly to or near left eyepiece 1102A, a right front-facing world camera 1106B attached directly to or near right eyepiece 1102B, a left side-facing world camera 1106C attached directly to or near left eyepiece 1102A, and a right side-facing world camera 1106D attached directly to or near right eyepiece 1102B. Wearable device 1101 may include one or more image projection devices such as a left projector 1114A optically linked to left eyepiece 1102A and a right projector 1114B optically linked to right eyepiece 1102B.

Wearable system 1100 may include a processing module 1150 for collecting, processing, and/or controlling data within the system. Components of processing module 1150 may be distributed between wearable device 1101 and remote device 1103. For example, processing module 1150 may include a local processing module 1152 on the wearable portion of wearable system 1100 and a remote processing module 1156 physically separate from and communicatively linked to local processing module 1152. Each of local processing module 1152 and remote processing module 1156 may include one or more processing units (e.g., central processing units (CPUs), graphics processing units (GPUs), etc.) and one or more storage devices, such as non-volatile memory (e.g., flash memory).

Processing module 1150 may collect the data captured by various sensors of wearable system 1100, such as cameras 1106, depth sensor or TOF sensor 1128, remote sensors 1130, ambient light sensors, eye trackers, microphones, inertial measurement units (IMUs), accelerometers, compasses, Global Navigation Satellite System (GNSS) units, radio devices, and/or gyroscopes. For example, processing module 1150 may receive image(s) 1120 from cameras 1106. Specifically, processing module 1150 may receive left front image(s) 1120A from left front-facing world camera 1106A, right front image(s) 1120B from right front-facing world camera 1106B, left side image(s) 1120C from left side-facing world camera 1106C, and right side image(s) 1120D from right side-facing world camera 1106D. In some embodiments, image(s) 1120 may include a single image, a pair of images, a video comprising a stream of images, a video comprising a stream of paired images, and the like. Image(s) 1120 may be periodically generated and sent to processing module 1150 while wearable system 1100 is powered on, or may be generated in response to an instruction sent by processing module 1150 to one or more of the cameras.

Cameras 1106 may be configured in various positions and orientations along the outer surface of wearable device 1101 so as to capture images of the user's surrounding. In some instances, cameras 1106A, 1106B may be positioned to capture images that substantially overlap with the FOVs of a user's left and right eyes, respectively. Accordingly, placement of cameras 1106 may be near a user's eyes but not so near as to obscure the user's FOV. Alternatively or additionally, cameras 1106A, 1106B may be positioned so as to align with the incoupling locations of virtual image light 1122A, 1122B, respectively. Cameras 1106C, 1106D may be positioned to capture images to the side of a user, e.g., in a user's peripheral vision or outside the user's peripheral vision. Image(s) 1120C, 1120D captured using cameras 1106C, 1106D need not necessarily overlap with image(s) 1120A, 1120B captured using cameras 1106A, 1106B.

In various embodiments, processing module 1150 may receive ambient light information from an ambient light sensor. The ambient light information may indicate a brightness value or a range of spatially-resolved brightness values. Depth sensor 1128 may capture a depth map 1132 in a front-facing direction of wearable device 1101. Each value of depth map 1132 may correspond to a distance between depth sensor 1128 and the nearest detected object in a particular direction. As another example, processing module 1150 may receive gaze information from one or more eye trackers. As another example, processing module 1150 may receive projected image brightness values from one or both of projectors 1114. Remote sensors 1130 located within remote device 1103 may include any of the above-described sensors with similar functionality.

Virtual content is delivered to the user of wearable system 1100 primarily using projectors 1114 and eyepieces 1102. For instance, eyepieces 1102A, 1102B may comprise transparent or semi-transparent waveguides configured to direct and outcouple light generated by projectors 1114A, 1114B, respectively. Specifically, processing module 1150 may cause left projector 1114A to output left virtual image light 1122A onto left eyepiece 1102A, and may cause right projector 1114B to output right virtual image light 1122B onto right eyepiece 1102B. In some embodiments, each of eyepieces 1102A, 1102B may comprise a plurality of waveguides corresponding to different colors. In some embodiments, lens assemblies 1105A, 1105B may be coupled to and/or integrated with eyepieces 1102A, 1102B. For example, lens assemblies 1105A, 1105B may be incorporated into a multi-layer eyepiece and may form one or more layers that make up one of eyepieces 1102A, 1102B.

Figure 12:
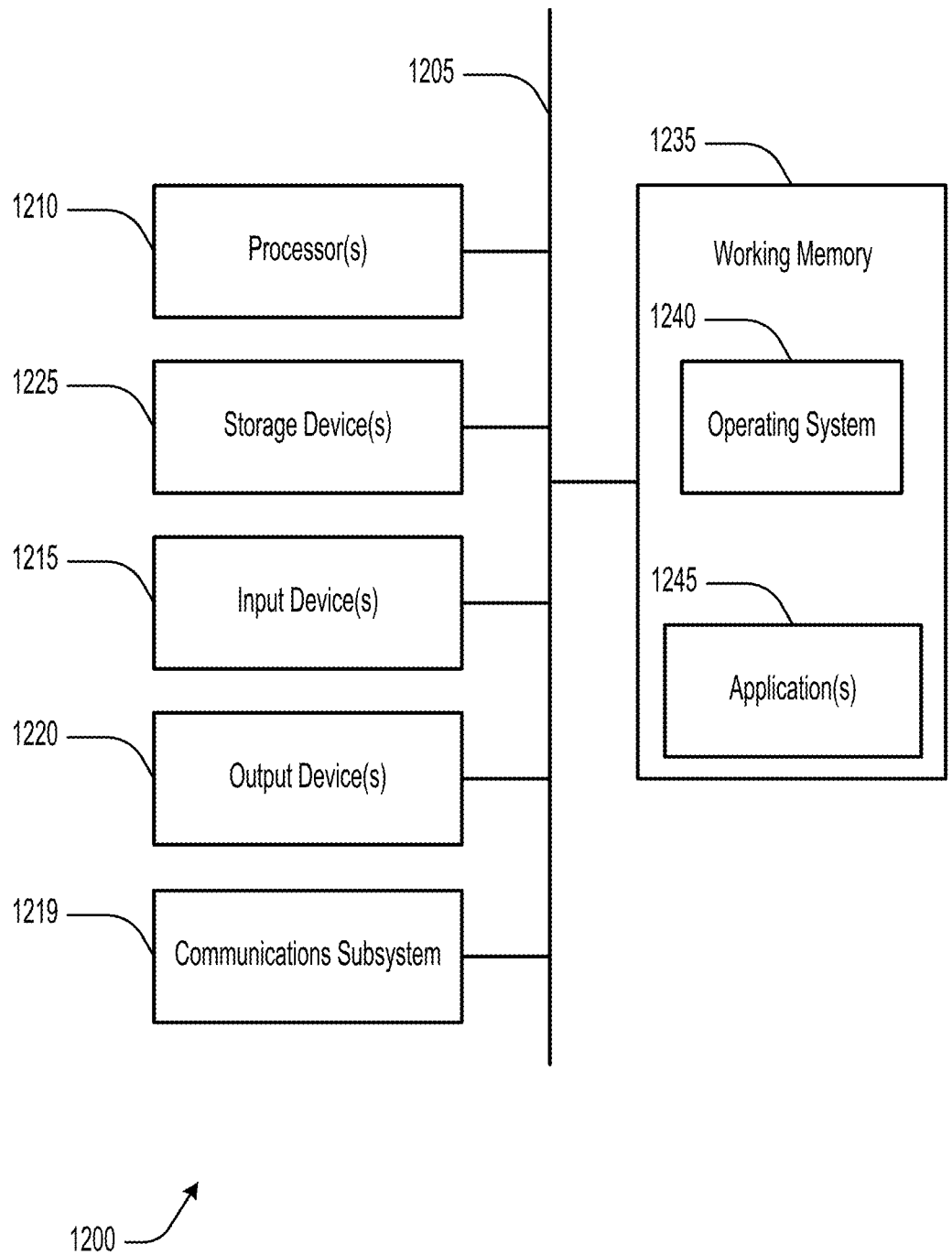
FIG. 12 illustrates a simplified computer system.

FIG. 12 illustrates a simplified computer system 1200, in accordance with some embodiments of the present disclosure. Computer system 1200 as illustrated in FIG. 12 may be incorporated into devices described herein. FIG. 12 provides a schematic illustration of one embodiment of computer system 1200 that can perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

Computer system 1200 is shown including hardware elements that can be electrically coupled via a bus 1205, or may otherwise be in communication, as appropriate. The hardware elements may include one or more processors 1210, including without limitation one or more general-purpose processors and/or one or more special-purpose processors such as digital signal processing chips, graphics acceleration processors, and/or the like; one or more input devices 1215, which can include without limitation a mouse, a keyboard, a camera, and/or the like; and one or more output devices 1220, which can include without limitation a display device, a printer, and/or the like.

Computer system 1200 may further include and/or be in communication with one or more non-transitory storage devices 1225, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1200 might also include a communications subsystem 1219, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1219 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1219. In other embodiments, a portable electronic device, e.g., the first electronic device, may be incorporated into computer system 1200, e.g., an electronic device as an input device 1215. In some embodiments, computer system 1200 will further include a working memory 1235, which can include a RAM or ROM device, as described above.

Computer system 1200 also can include software elements, shown as being currently located within the working memory 1235, including an operating system 1240, device drivers, executable libraries, and/or other code, such as one or more application programs 1245, which may include computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1225 described above. In some cases, the storage medium might be incorporated within a computer system, such as computer system 1200. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1200 and/or might take the form of source and/or installable code, which, upon compilation and/or installation on computer system 1200 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1200 to perform methods in accordance with various embodiments of the technology. According to a set of embodiments, some or all of the procedures of such methods are performed by computer system 1200 in response to processor 1210 executing one or more sequences of one or more instructions, which might be incorporated into the operating system 1240 and/or other code, such as an application program 1245, contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1200.

The communications subsystem 1219 and/or components thereof generally will receive signals, and the bus 1205 then might carry the signals and/or the data, instructions, etc. carried by the signals to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes one or more of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a time-of-flight (TOF) sensor, the method comprising:
    operating the TOF sensor in a low power mode by repeatedly performing a low power mode sequence, wherein performing the low power mode sequence includes:
        performing a depth frame, wherein performing the depth frame includes emitting light pulses, detecting reflected light pulses, and computing a depth map based on the detected reflected light pulses; and
        performing an amplitude frame at least one time, wherein performing the amplitude frame includes emitting a light pulse, detecting a reflected light pulse, and computing an amplitude map based on the detected reflected light pulse;
    determining that an activation condition is satisfied; and
    in response to determining that the activation condition is satisfied, switching from operating the TOF sensor in the low power mode to operating the TOF sensor in a high accuracy mode by repeatedly performing a high accuracy mode sequence, wherein performing the high accuracy mode sequence includes:
        performing the depth frame multiple times.

2. The method of claim 1, wherein performing the depth frame further includes:
    computing three-dimensional (3D) positions of a plurality of keypoints along a target object based on the depth map.

3. The method of claim 2, wherein the target object is a user's hand.

4. The method of claim 3, wherein determining that the activation condition is satisfied includes:
    determining that the user's hand is currently interacting or is about to interact in a Z dimension.

5. The method of claim 2, wherein performing the amplitude frame further includes:
    computing two-dimensional (2D) positions of the plurality of keypoints along the target object based on the amplitude map.

6. The method of claim 5, wherein performing the amplitude frame further includes:
    estimating the 3D positions of the plurality of keypoints along the target object based on the 2D positions of the plurality of keypoints.

7. The method of claim 6, wherein the 3D positions of the plurality of keypoints are estimated further based on the depth map.

8. A system for operating a time-of-flight (TOF) sensor, the system comprising:
    one or more processors; and a non-transitory computer-readable medium comprising instructions that, when executed by the one or more processors, cause the one or more processors to perform operations comprising:
  operating the TOF sensor in a low power mode by repeatedly performing a low power mode sequence, wherein performing the low power mode sequence includes:
    performing a depth frame, wherein performing the depth frame includes emitting light pulses, detecting reflected light pulses, and computing a depth map based on the detected reflected light pulses; and
    performing an amplitude frame at least one time, wherein performing the amplitude frame includes emitting a light pulse, detecting a reflected light pulse, and computing an amplitude map based on the detected reflected light pulse;
  determining that an activation condition is satisfied; and
  in response to determining that the activation condition is satisfied, switching from operating the TOF sensor in the low power mode to operating the TOF sensor in a high accuracy mode by repeatedly performing a high accuracy mode sequence, wherein performing the high accuracy mode sequence includes:
    performing the depth frame multiple times.

9. The system of claim 8, wherein performing the depth frame further includes:
  computing three-dimensional (3D) positions of a plurality of keypoints along a target object based on the depth map.

10. The system of claim 9, wherein the target object is a user's hand.

11. The system of claim 10, wherein determining that the activation condition is satisfied includes:
  determining that the user's hand is currently interacting or is about to interact in a Z dimension.

12. The system of claim 9, wherein performing the amplitude frame further includes:
  computing two-dimensional (2D) positions of the plurality of keypoints along the target object based on the amplitude map.

13. The system of claim 12, wherein performing the amplitude frame further includes:
  estimating the 3D positions of the plurality of keypoints along the target object based on the 2D positions of the plurality of keypoints.

14. The system of claim 13, wherein the 3D positions of the plurality of keypoints are estimated further based on the depth map.

15. A non-transitory computer-readable medium comprising instructions that, when executed by one or more processors, cause the one or more processors to perform operations for operating a time-of-flight (TOF) sensor, the operations comprising:
  operating a TOF sensor in a low power mode by repeatedly performing a low power mode sequence, wherein performing the low power mode sequence includes:
    performing a depth frame, wherein performing the depth frame includes emitting light pulses, detecting reflected light pulses, and computing a depth map based on the detected reflected light pulses; and
    performing an amplitude frame at least one time, wherein performing the amplitude frame includes emitting a light pulse, detecting a reflected light pulse, and computing an amplitude map based on the detected reflected light pulse;
  determining that an activation condition is satisfied; and
  in response to determining that the activation condition is satisfied, switching from operating the TOF sensor in the low power mode to operating the TOF sensor in a high accuracy mode by repeatedly performing a high accuracy mode sequence, wherein performing the high accuracy mode sequence includes:
    performing the depth frame multiple times.

16. The non-transitory computer-readable medium of claim 15, wherein performing the depth frame further includes:
  computing three-dimensional (3D) positions of a plurality of keypoints along a target object based on the depth map.

17. The non-transitory computer-readable medium of claim 16, wherein the target object is a user's hand.

18. The non-transitory computer-readable medium of claim 17, wherein determining that the activation condition is satisfied includes:
  determining that the user's hand is currently interacting or is about to interact in a Z dimension.

19. The non-transitory computer-readable medium of claim 16, wherein performing the amplitude frame further includes:
  computing two-dimensional (2D) positions of the plurality of keypoints along the target object based on the amplitude map.

20. The non-transitory computer-readable medium of claim 19, wherein performing the amplitude frame further includes:
  estimating the 3D positions of the plurality of keypoints along the target object based on the 2D positions of the plurality of keypoints.

* * * * *